April 30, 1935. E. J. W. RAGSDALE 1,999,372
AIRPLANE WING STRUCTURE
Filed May 12, 1932   3 Sheets-Sheet 1
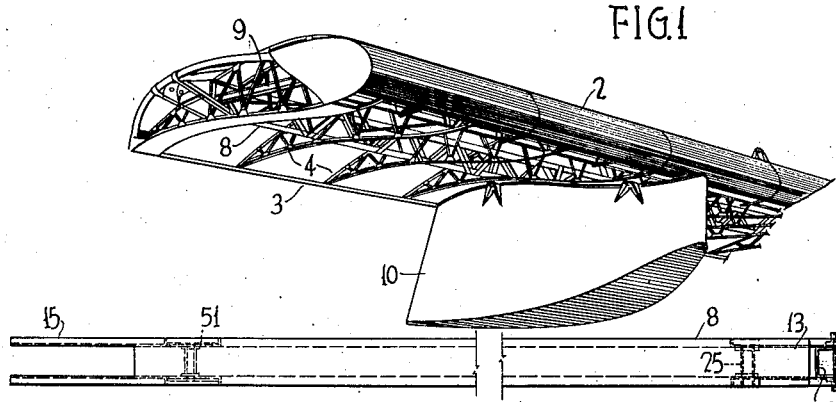
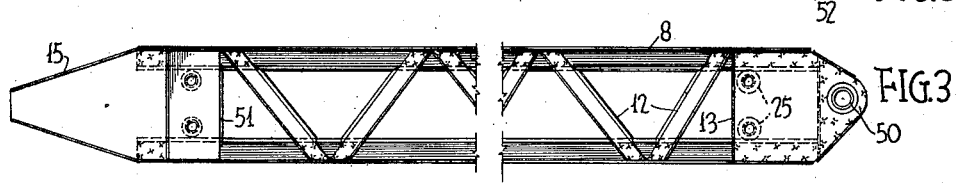
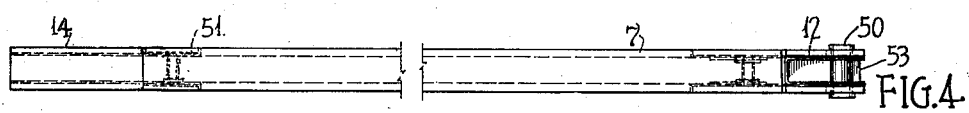
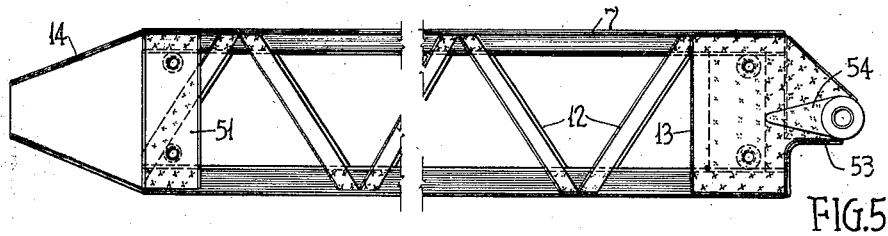
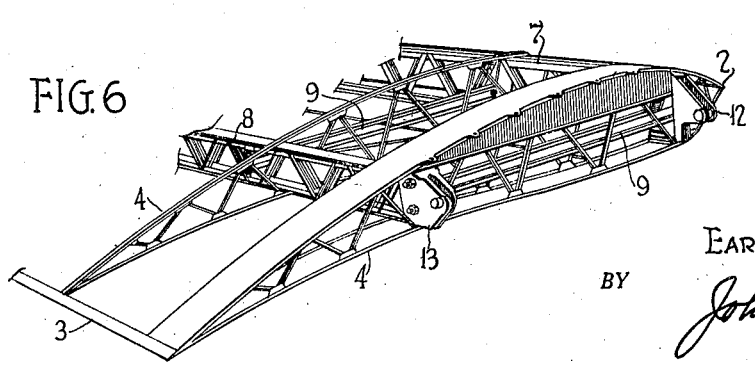
INVENTOR.
EARL J.W. RAGSDALE.
BY
ATTORNEY.

April 30, 1935.  E. J. W. RAGSDALE  1,999,372
AIRPLANE WING STRUCTURE
Filed May 12, 1932   3 Sheets-Sheet 2
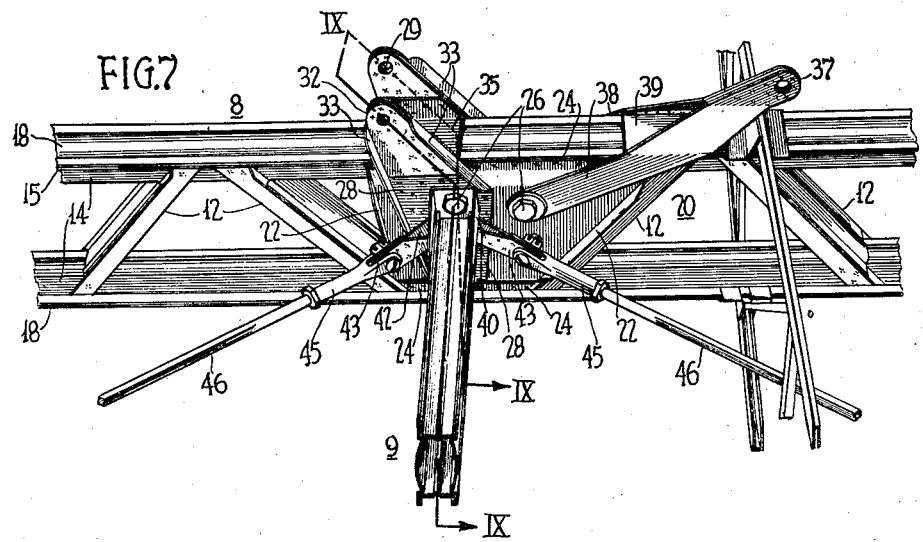
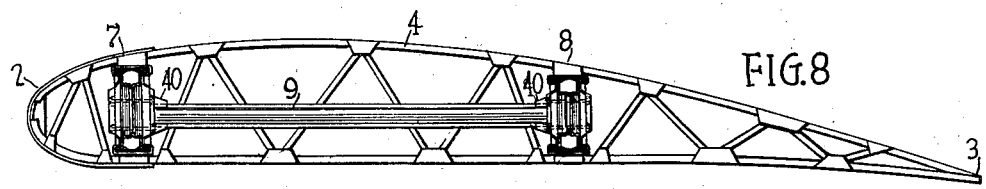
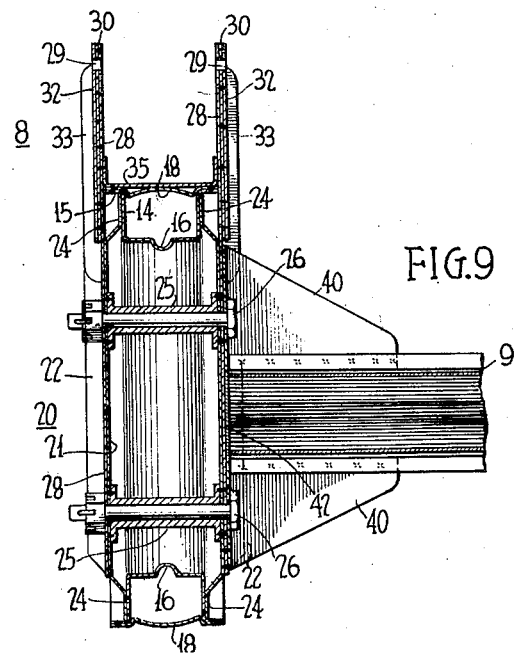
INVENTOR
Earl J. W. Ragsdale
BY
John P. Taylor
ATTORNEY April 30, 1935.  E. J. W. RAGSDALE  1,999,372
AIRPLANE WING STRUCTURE
Filed May 12, 1932   3 Sheets-Sheet 3

INVENTOR
EARL J.W. RAGSDALE
BY John P. Tarbox
ATTORNEY

Patented Apr. 30, 1935

1,999,372

UNITED STATES PATENT OFFICE 1,999,372

AIRPLANE WING STRUCTURE

Earl J. W. Ragsdale, Norristown, Pa., assignor to Edward G. Budd Manufacturing Company, Philadelphia, Pa., a corporation of Pennsylvania Application May 12, 1932, Serial No. 610,784

5 Claims. (Cl. 244—31)

My invention relates to airplanes and particularly to wing structures therefor.

One object of my invention is to provide a wing structure that shall be simple and durable in construction, economical to manufacture and effective in its operation.

Another object of my invention is to provide a wing structure that shall facilitate its manufacture almost entirely of metal, whereby to be of light weight, great strength and free from rust.

Another object of my invention is to reduce the number and weight of the wing parts by shaping and placing them to facilitate spot welding, whereby to practically eliminate small connecting elements, such as bolts, screws, nuts and the like.

Other objects include the provision of a novel compression beam, a single means constituted as a spar upright and as connecting means for other elements, a wing tip, an inner-end support and other features, as will hereinafter appear.

Figure 10:
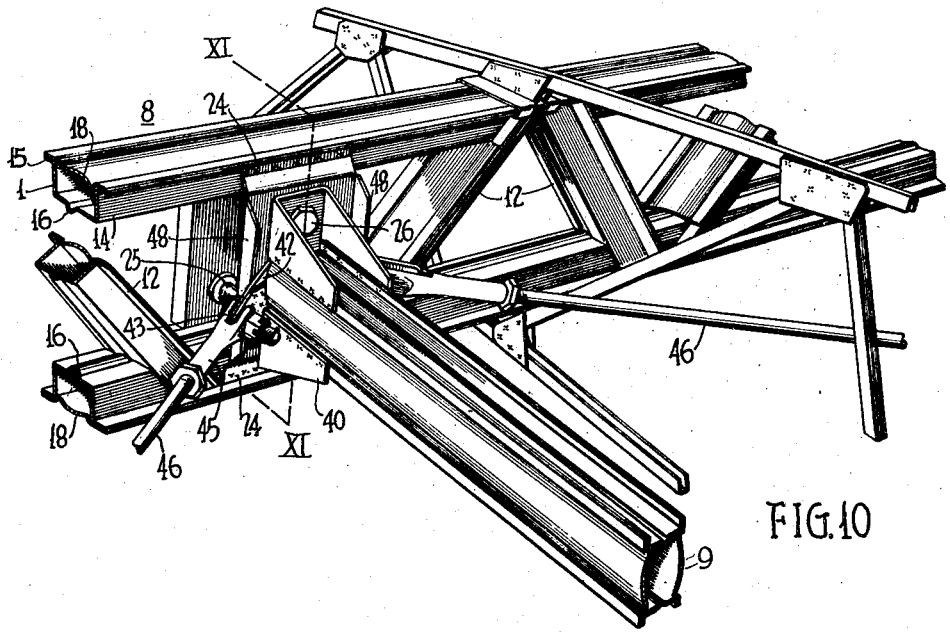
Figure 11:
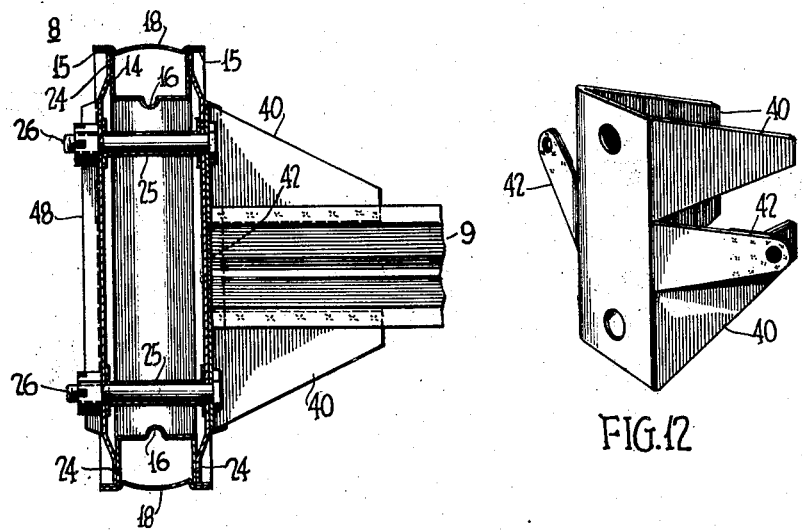
Figure 12:
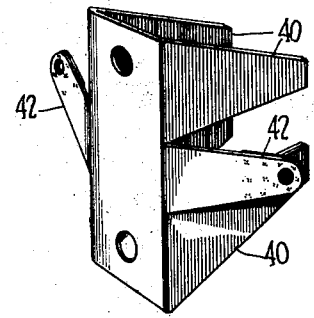

Fig. 1, of the accompanying drawings, is a perspective view, from beneath, of the outer end of a lower, or float-supported, wing structure of my invention, the fabric being removed, Fig. 2 is a detail top plan view of the rear spar of the wing, Fig. 3 is a view, in side elevation, of the spar of Fig. 2, Figs. 4 and 5 are views, similar to Figs. 2 and 3, respectively, of the front spar, Fig. 6 is a fragmentary perspective view of the inner end of the wing structure, Fig. 7 is an enlarged detail perspective view of portions of the rear spar, together with parts co-operating therewith, Fig. 8 is a fore-and-aft section of the wing structure, showing a fabric-supporting rib and a compression frame, in side elevation, and the spars in cross section, Fig. 9 is an enlarged detail view, taken substantially along the line IX—IX of Fig. 7, Fig. 10 is a view, similar to Fig. 7, of another portion of the rear spar and parts associated therewith, Fig. 11 is a view, similar to Fig. 9, taken substantially along the line XI—XI of Fig. 10, and Fig. 12 is a detail perspective view of a one-piece combined gusset and guy-wire attaching element embodied in the invention.

The device comprises, in general, a leading edge 2, a trailing edge 3, fabric-supporting or load ribs 4, front and rear spars 7 and 8, respectively, compression frames 9, a float 10, inner-end supports 12 and 13 for the front and rear spars, respectively, and wing-tip elements 14 and 15 for the front and rear spars, respectively.

My invention relates particularly to the spars 7 and 8, the compression frames 9, the inner-end supports 12 and 13, and the tip elements 14 and 15, together with appurtenant parts, to be hereinafter set forth; the leading edge 2, the trailing edge 3, the load ribs 4 and the float 10 either being old in the art or subjects of other of my applications.

The spars are similarly constructed, each comprising, in general, spaced upper and lower beams of hollow section and reinforced by diagonal brace members 12; the beams being preferably of box-section comprising, as shown more clearly in Figs. 7, 9 and 10, a portion 14 of rectangular channel section having transverse edge flanges 15 and a reinforcing rib or bead 16 of channel section. A cover plate 18 has a transversely curved longitudinal mid section and edges spot welded in side-by-side engagement with the flanges 15. The diagonal braces 12 are preferably of box section similar to the spar beams and have their side walls extended in overlapping relation to the side walls of the beams and spot welded thereto.

Referring particularly to Figs. 7 and 9 showing a joint construction in a location where the wing structure is subject to maximum strains, an upright 20 connecting the spar beams, comprises inner elements 21 of outwardly-opening channel section having upright side walls or edge flanges 22 sloping relative to each other and inwardly offset ends 24 that are spot welded in side-by-side engagement with the sides of the spar beams within the flanges 15 thereof. Tubular elements 25, having radial end flanges spot welded to the elements 21 and constituting transverse braces therefor, receive bolts 26.

Reinforcing plates 28 are spot welded to the outer surfaces of the elements 21, under the heads of the bolts 26, and extend upwardly beyond the upper spar beams to positions where they are provided with transversely registering openings 29. Flat plates 30, next to the outer sides of the apertured projecting portions of the plates 28, and outer plates 32, having edge flanges 33, and conforming to the apertured projecting portions 28, are spot welded in side-by-side relation to the plates 28 and are similarly provided with apertures 29 to, in effect, provide a clevis. The ears of the clevis, at opposite sides of the spar, are therefore, of laminated construction and are further braced by a gusset 35, of channel section, therebetween in spot welded relation thereto. This clevis constitutes a strut end mounting.

An inter wing brace-wire terminal, or attaching means, comprises flat strap-like elements spot welded together, at one end, to provide an eye 37 and spaced apart, at the other ends 38, to provide a clevis embracing the spar, are secured in position, as by one of the bolts 26. A transverse gusset 39 is provided between the eye-andclevis brace-wire terminal elements, over the top beam of the spar.

The compression beam 9, opposite this part of the spars, is of hollow or box section, all sides of which are substantially of channel section spot welded together through their out turned overlapping flanged edges and which has perpendicular side-edge flanges to which similar gusset portions 40 are spot welded.

Each of the gusset portions 40 is of substantially U-shape embracing the end of the beam 9, with its closed end against the outer surface of the upright between the spar beams, and having a portion extending transversely to the axis of the beam away from the latter for mounting under the head of the bolts 26 and, also, for spot welding to the upright.

An intra-spar diagonal-bracing wire-attaching element 42, disposed, in one direction, between the beam 9 and the spar upright, to which it is spot welded, and in an upright direction, between the gussets 40, is preferably integral with the gusset portions 40. That is, the gusset portions 40 and the element 42 are preferably of one piece of sheet metal cut and bent to the shapes shown.

The ends of the element 42 are reinforced, by additional sheet-metal layers spot welded thereto, to provide eye-portions 43 of great strength for the reception of clevis terminal members 45 of brace wires 46.

Referring to Figs. 10 and 11, the structure is similar to that of Figs. 7 and 9, with the strut-mounting and inter wing brace wire-elements omitted and the upright side plates, corresponding, to the uprights 21, having vertical side edge flanges 48, instead of the sloping edges 22. The other parts, corresponding to the structure of Figs. 7 and 9, are designated by corresponding reference characters.

Referring to Figs. 2 and 3, the rear spar 8 is provided, at its inner end, with the end-support uprights 13, similar to the uprights 21, having tubular transverse braces 25 corresponding to the tubes 25 of the other figures, but further provided with outwardly edge-flanged portions, projecting from the inner end of the spar, between which a tubular element 50 is secured. This element serves as transverse bracing means, similar to the tubes 25, between the uprights and also, to receive a pin to mount the wing on the fuselage. These end upright plates are also laminated or reinforced, as by channel members 52 and spot welded through a substantial length of the top and bottom beams to form a secure anchorage for the wing.

Further uprights 51, similar to the uprights 21 and having vertical edge flanges, are provided adjacent to, but spaced inwardly from, the wing-tip elements 15. The latter are in the form of plate gussets spot welded in side engagement with the spar beams and having upright edge flanges and sloping edge flanges converging outwardly in the direction of the spar.

The front spar structure, of Figs. 4 and 5, is substantially the same as that of the rear spar, with the exception of the side contour of the inner-end pin-receiving end-supports 12, a lower reinforcing plate 53 conforming thereto and reinforcing side plates 54 for the tube 50.

In the above-described structure, the spar uprights and the beams 9 constitute a simple structure of substantially H-shape, of great strength and of few parts compared to truss-like beams heretofore suggested, for bracing the spars, supporting the strut-mountings, the brace-wire terminals and the drag-wire attaching means, and rendering the wing, as a unit, strong and durable.

All of the parts are constructed of stainless steel and with a particular view to obtaining maximum strength and minimum weight, and facilitating spot welding.

While I have shown and described a particular form of my invention, changes may be effected therein without departing from the spirit and scope thereof, as set forth in the appended claims.

I claim as my invention:

1. An airfoil comprising spars, one of which includes upper and lower beams, an upright comprising a pair of upright members at opposite sides of said beams, upper and lower transverse connecting means for said upright members, a compression beam meeting one of said uprights between said connecting means and gussets secured to the compression beam and extending laterally therefrom to said connecting means by which they are connected to the spar.

2. An airfoil comprising spars, one of which includes an upright side surface, a hollow box section sheet metal beam having upper and lower edge flanges extending between the spars and a gusset of substantially U-shape embracing one end of the beam and secured to said flanges with its end adjacent to said surface extended above and below said beam and secured to said surface through such extensions.

3. An airfoil comprising spars, each including upper and lower beams, oppositely disposed uprights between the beams of the respective spars, a compression-beam of box section having upper and lower edge flanges and extending between said uprights, upper and lower channel section gusset portions at one end of the compression beam having their side walls secured to said edge flanges and secured through their bottom walls to the adjacent upright, and brace-wire attaching portions integral with said gussets and secured between the upright and the compression beam and extending laterally therebeyond at a position between said gusset portions.

4. An airfoil construction comprising a spar including spaced upper and lower beams having edge flanges, plates connecting the upper and lower beams, and having inwardly offset edge flanges welded to the side walls of said beams, the main bodies of said plates being substantially in the plane of the margins of the edge flanges of said beams, reinforced gusset members overlapping the main bodies of said connecting plates and spot welded thereto and extending beyond the top of the beam to provide anchorage means, and a channel member welded to the edge flanges of the upper beam and to said gussets and interbracing the same.

5. An airfoil construction comprising a spar including spaced upper and lower beams having edge flanges, plates connecting the upper and lower beams and welded to the side walls of said beams, and having their main bodies substantially in the plane of the margins of said flanges, said plates forming a foundation for anchoring the fittings for securing the end of an intra-wing strut, an extra-wing strut and brace wires extending in different directions, and the fittings, an intra-wing strut, an extra wing strut and the brace wires aforesaid.

EARL J. W. RAGSDALE.